July 8, 1958 — A. M. WRIGHT — 2,842,062
VORTEX PUMP

Filed Oct. 31, 1951 — 2 Sheets-Sheet 1

INVENTOR
A. M. WRIGHT
BY A. M. Prentiss
ATTORNEY

July 8, 1958 — A. M. WRIGHT — 2,842,062
VORTEX PUMP
Filed Oct. 31, 1951 — 2 Sheets-Sheet 2
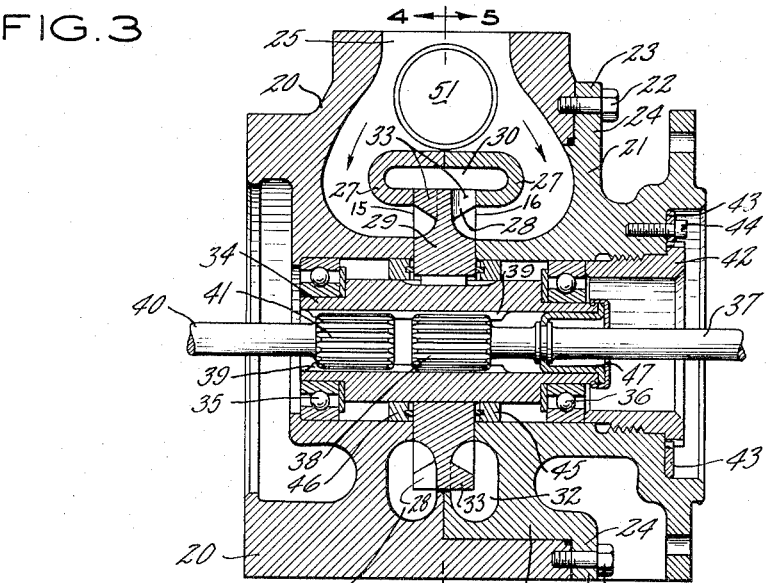
INVENTOR
A. M. WRIGHT
BY [signature]
ATTORNEY

United States Patent Office 2,842,062
Patented July 8, 1958

2,842,062

VORTEX PUMP

Alexander M. Wright, West Hartford, Conn., assignor, by mesne assignments, to Pratt & Whitney Company, Incorporated, West Hartford, Conn., a corporation of Delaware Application October 31, 1951, Serial No. 254,022

10 Claims. (Cl. 103—96)

This invention pertains to a type of rotary pump having flat, radial impeller blades, integral with the impeller rotor. Such pumps have been used industrially for many years in applications where high head and moderate flow are required and are commonly known as "turbine type" pumps. However, the name "turbine type" is a misnomer, since this term has been generally applied to centrifugal pumps that are fitted with diffuser vanes in the volute casing. Also, in aircraft work, the name "turbine pumps" is rather loosely applied to pumps driven by air turbines. The name "vortex pump" is a more descriptive term for the type of pump to which this invention pertains and will be used in this application.

An analysis of the principles of operation of the vortex pump indicates that it has the following distinct advantages which make it particularly suitable for use as a fuel boost pump for aircraft engines:

(1) Ability to handle considerable quantities of liquid fuel at moderate or high discharge pressures.

(2) High head in a single stage, with small diameter impeller wheel.

(3) Fairly large capacity.

(4) Small over-all size and weight.

(5) Simplicity of construction.

However, vortex pumps heretofore in use have three serious disadvantages which have largely precluded their application to aircraft work, namely:

(1) Rather poor efficiency, as compared with gear, vane and centrifugal pumps.

(2) Limited ability to operate satisfactorily under inlet suction conditions.

(3) High internal pressure and maximum power consumption at discharge shut-off.

From an analysis of the characteristics of the vortex pump, I have found that the above disadvantages stem largely from the toroidal or vortex currents that are set up by the rotation of the impeller in planes at right angles to the plane of said rotation. These vortex currents absorb by internal friction increasing percentages of the pump input power as the speed of the pump impeller increases. Also, at any given impeller speed, the velocity of these vortex currents increases as the discharge of the pump is decreased (by restriction of the discharge passage) until, at zero discharge, the energy loss from vortex circulation is equal to the total pump input power.

If means could be found to reduce the magnitude of the adverse characteristics mentioned above, the advantages of the vortex pump would greatly outweigh its disadvantages, for use as an aircraft engine fuel boost pump.

Accordingly, a primary object of this invention is to provide ways and means whereby the adverse characteristics of prior art vortex pumps, mentioned above, are greatly reduced, without materially affecting the advantages of this type of pump for use as a fuel boost pump.

Another object is to provide an improved vortex pump in which the vortex currents at the entrance to the impeller are materially reduced and the pump efficiency is thereby increased over that of prior art pumps of this type.

A further object is to devise an improved vortex pump in which the inlet suction characteristics are greatly improved over those of prior art vortex pumps.

A further object is to provide a vortex pump with greatly improved pressure volume characteristics for use as an aircraft engine fuel pump and particularly as a fuel boost pump.

A still further object is to provide an improved vortex pump in which the pressure level of the pump is materially reduced and the internal pressure is limited to a desired maximum.

With these and other objects in view which may be incident to my improvements, my invention consists in the combination and arrangement of elements hereinafter described and illustrated in the accompanying drawings, in which:

Fig. 3 is an axial cross-section of an improved vortex pump, in accordance with one embodiment of my invention.

Fig. 4 is a vertical section through the left-hand housing of the pump shown in Fig. 3, viewed from the line 4—4 of Fig. 3 (with the impeller omitted).

Fig. 5 is a similar view of the right-hand housing, viewed from the line 5—5 of Fig. 3 (with the impeller omitted).

Fig. 6 is a fragmentary plan view of the impeller of the pump shown in Figs. 3, 4 and 5.

Figure 1:
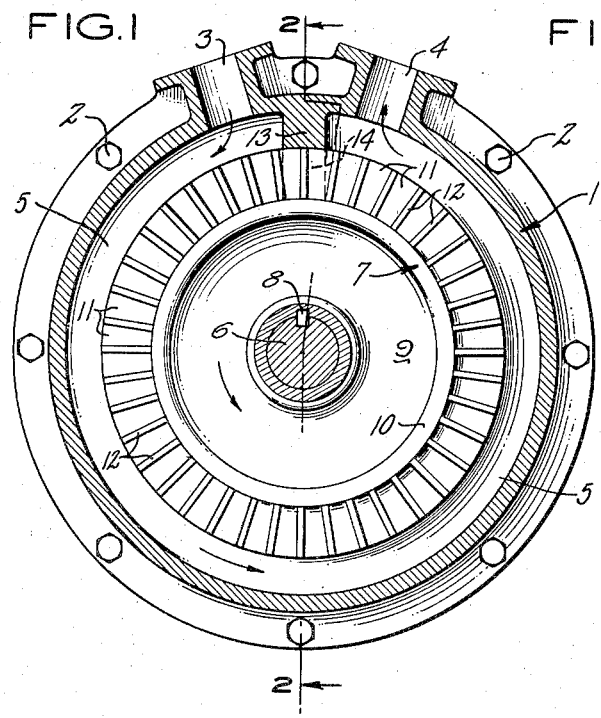
Fig. 1 shows, for comparison, a typical prior art vortex pump, in central longitudinal section.
Figure 2:
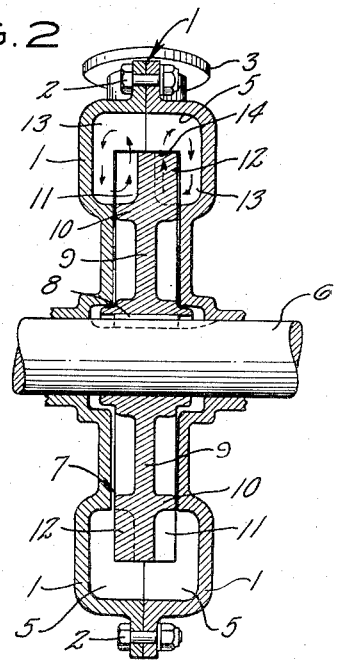
Fig. 2 is a cross-section on the line 2—2, of the pump shown in Fig. 1.

Referring first to Figs. 1 and 2, the reference numeral 1 denotes a pump housing which is made in two matching halves and bolted together by flange bolts 2. Housing 1 is provided with a fluid inlet 3 and discharge outlet 4 which are connected by a fluid passage 5 of constant cross-section. At the center of housing 1 is journalled a shaft 6 on which a pump impeller 7 is mounted and fixed by a key 8. Near the inner periphery of the passage 5, the web 9 of impeller 7 is provided with a circular flange 10 whose width is just sufficient to bridge the adjacent space between the two halves of housing 1, with the minimum clearance to permit the free rotation of the impeller 7 therebetween. Extending radially beyond the flange 10, the circumference of impeller 7 is provided with two parallel series of notched buckets 11 which define two corresponding parallel series of flat radial blades 12, extending into the center of passage 5, in staggered relation to each other (see Fig. 6). Between inlet 3 and outlet 4, housing 1 carries an inwardly extending transverse baffle wall 13 having a notch 14, dimensioned to closely embrace the vanes 12, with just sufficient clearance to permit the passage of said blades therethrough upon rotation of impeller 7. Baffle 13, known as a "cut-water," separates the inlet and outlet ends of passage 5, except for the relatively small space within a bucket 11.

The fluid (e. g. water) entering through inlet 3 fills passage 5, including the buckets 11, and upon rotation of impeller 7, is carried by said buckets and by frictional contact with the other surfaces of the impeller, to the outlet 4. Owing to the centrifugal force imparted by the rotating impeller to the fluid in passage 5 (and especially that portion in buckets 11), said fluid is thrown outwardly against the outer wall of passage 5 with increasing force as it traverses passage 5 from inlet 3 to outlet 4. Upon contact with cut-water 13, the tangential velocity of the moving column of fluid in passage 5 is reduced to zero (except for a very small leakage through buckets 11). This causes a corresponding rise in pressure which, added to the pressure generated by the centrifugal force of the rotating impeller 7, creates the discharge pressure of the pump which forces the fluid out through outlet 4 in a radial direction.

Since the centrifugal force of a rotating body increases as the radius from the center of rotation, the fluid pressure in the outer part of channel 5 (beyond blades 12) is greater than the fluid pressure in the corresponding inner part of said channel (i. e. adjacent blades 12). This difference in fluid pressures causes the fluid to flow in a generally circular path, at right angles to the plane of rotation of the impeller, as indicated by the arrows in Fig. 2. The vortex currents set up by this toroidal circulation absorb (by internal friction) increasing percentages of the input power applied to the pump shaft 6, as the impeller speed increases. Also, at any given impeller speed, the velocity of these vortex currents increases as the discharge of the pump is decreased (by restriction of the discharge outlet) until, at zero pump discharge, the energy loss from vortex circulation is equal to the total pump input power. Since the gain in pressure from the root to tip of each blade 12, due to centrifugal force, equals the loss in pressure, due to friction against the stationary walls of passage 5, the resulting vortex circulation adds nothing to the discharge pressure of the pump and thus constitutes a net loss in pump efficiency. It is thus obvious that if this energy dissipation could be avoided, the efficiency of the vortex pump would be correspondingly improved.

In addition to the foregoing loss of efficiency, there is also a further loss of efficiency in the conventional vortex pump shown in Figs. 1 and 2, due to the friction and turbulence caused by the churning of the fluid in the inlet passage of the pump from the cutting of the impeller blades 11 through the column of fluid in said passage.

In order to reduce the above mentioned losses in efficiency to a minimum, I have devised the improved form of vortex pump illustrated in Figs. 3–8, inclusive. Referring first to Figs. 3, 4 and 5, the reference numeral 20 denotes the main housing of the pump into which is fitted a matching flange housing 21, secured by a plurality of tap bolts 22 passing through lugs 23 in flange 24 of housing 21 (see Fig. 5). Housings 20 and 21 are provided with contoured internal grooves in their matching faces which define a series of passages for the circulation of fluid from inlet 25 to discharge outlet 26. Inlet 25 is bifurcated by a baffle 27 so that the entering column of fluid is divided into two equal parts which enter buckets 28 on each side of impeller 29, as clearly shown in Fig. 3. Baffle 27 is internally contoured to define a fluid passage 30 which communicates through arcuate ports 15 and 16, respectively, with two parallel passages 31 and 32 that in turn merge into a discharge passage 26a which leads to outlet 26. By virtue of this arrangement, the fluid entering the impeller 29 is fed into the impeller laterally from each side thereof, and is precluded from shearing contact with the outer periphery of the rotating impeller, as in the conventional vortex pump shown in Figs. 1 and 2. This substantially reduces the energy loss and cavitation from turbulence caused by the churning of the fluid in the inlet passage by the undercutting of the impeller blades across said passage, as in the conventional vortex pump. The buckets 28 in the periphery of impeller 29 define two series of flat, radial blades 33, spaced in staggered relation, as shown in Fig. 6.

Impeller 29 is mounted upon and keyed to a hollow cylindrical shaft 34 which is supported by ball bearings 35 and 36 in housings 20 and 21, and driven by a drive shaft 37 having a grooved head 38 which slidably engages splines 39 on the inner wall of shaft 34, as shown in Fig. 3. Where it is desired to drive a second pump, generator, or other engine accessory, from the drive shaft 37, a connecting shaft 40, having a grooved head 41, may be slidably connected to shaft 34, as shown in Fig. 3. Impeller 29 is held in adjustable relation with minimum running clearance, between adjacent surfaces of housings 20 and 21, by a sleeve nut 42 which is threaded into housing 21 and secured in desired adjusted position by a locking ring 43, attached to housing 21 by tap bolt 44. Sealing rings 45 and 46 prevent the escape of fluid between the adjacent surfaces of impeller 29 and housings 20 and 21, and a bearing seal 47 prevents the escape from the pump of any fluid which may have leaked past sealing rings 45 and 46.

Figure 7:
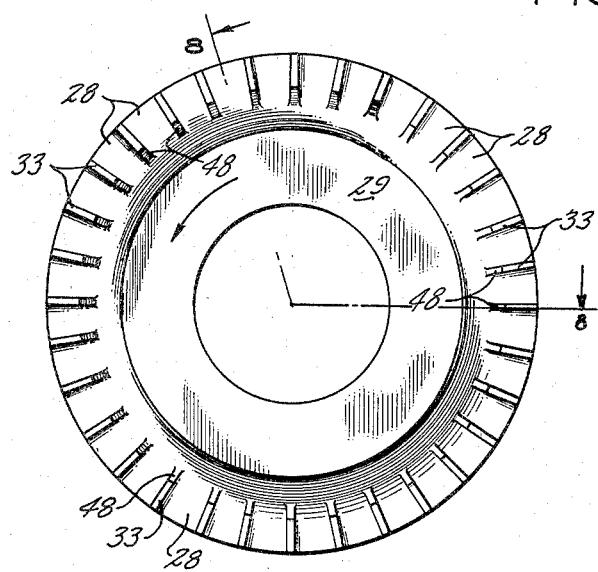
Fig. 7 is a side elevation of the impeller shown in Fig. 3.
Figure 8:
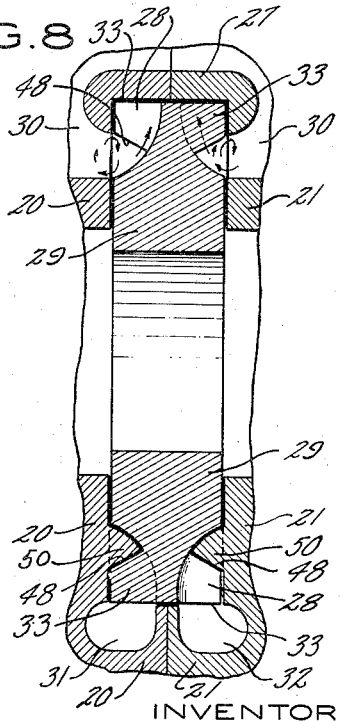
Fig. 8 is an axial section on the line 8—8 of the impeller shown in Fig. 7, also showing portions of the housing adjacent to said impeller.

Referring now to Figs. 7 and 8, which show impeller 29 on an enlarged scale, it will be noted that blades 33 are provided with undercut, triangular notches 48 into which fit, with minimum running clearance, correspondingly shaped lugs 49 and 50 which are integral with the walls of housings 20 and 21 (see also Figs. 4 and 5). By virtue of notches 48, the fluid entering the impeller from inlet passage 30 through arcuate ports 15, is introduced at the root of blades 33, at an angle of about 45° with the plane of rotation of the impeller, and said fluid is not engaged by said blades until it is clear of inlet passage 30. This materially reduces the vortex currents that would otherwise be set up in the fluid passage between the rotating impeller and the stationary walls of housings 20 and 21, as in the case of the conventional vortex pump described hereinabove and indicated by dotted arrows in Fig. 2. Lugs 49 and 50 prevent the entering fluid from passing directly from ports 15 and 16 into passages 31 and 32 and thus constrains all of said fluid to flow through buckets 28 of the impeller 29, thus improving the pump inlet cavitation conditions. In the absence of lugs 49 and 50 which engage the notches 48, vortex currents would also be set up on a smaller scale in the reduced region of the notches 48 as indicated by dotted arrows in the upper part of Fig. 8.

It will be noted from Figs. 4 and 5 that lugs 50 are located adjacent to the inner end of inlet 30, where they function as a cutwater, in a manner similar to baffle 13 of Figs 1 and 2. Thus, lugs 50 guide and force the inlet fluid to enter the impeller at the root of blades 33, while lugs 49 similarly guide and force the liquid from the impeller buckets 28 into discharge passage 26. I have found that the conjoint use of notches 48 and lugs 49 and 50 substantially eliminates the vortex currents that are set up in the fluid passage between the rotating impeller and stationary walls of the housing in prior art vortex pumps. This, together with the bifurcation of the inlet passage by baffle 27, as described hereinabove, results in a marked decrease in the cavitation propensities of the pump and some improvement in the overall efficiency of the pump due to reduction of churning and turbulence of the fluid in the inlet passages.

Another advantage of undercutting the impeller blades, as by notches 48, and modifying the cutwater, as by the use of lugs 49 and 50, is that this facilitates shaping the pressure volume characteristic of the pump as desired. This follows from the fact that the pressure volume characteristic is governed by the area of the vortex channel of the pump and of radii of impeller blades. Where a flat characteristic is desired (as in a fuel boost pump), undercutting the blades favorably affects both of these factors and greatly improves the pressure volume characteristic of the pump permitting it to operate with less power input than in the case where the blades are not undercut in the manner described. Thus, from comparative runs of two pumps, with all factors the same except one had conventional blades and cutwater, as shown in Figs. 1 and 2, while the other had undercut blades and a modified cutwater, as shown in Figs. 7 and 8, I have found that such undercutting of the blades and modification of the cutwater, showed a reduction in pressure rise across the pump, ranging from approximately 25 percent (e. g., from 160 to 140 p. s. i., at 5 gallons per minute pump discharge), to approximately 30 percent (e. g., from 110 to 77 p. s. i., at 47 gallons per minute discharge), when pumping aviation gasoline at 70° F., with a constant impeller speed of 3400 R. P. M.

There are also further substantial advantages which result from the novel construction of my improved pump, as shown in Figs. 3–8, inclusive. These have to do with the ability of a vortex type pump to handle fluid of high volatility (such as aircraft engine fuel) which I have found depends principally upon the inlet conditions in the pump. Thus, the quantity of fluid that a vortex pump can handle is limited by the condition that the static pressure of the fluid must always exceed the vapor pressure, or "bubble point" of the fluid, which latter is usually less than the vapor pressure. The loss of static pressure in the fluid entering a vortex pump is governed by: (a) the inlet pipe loss and (b) the fluid velocity in the region of entrance into the impeller. Of these two factors, the latter is by far the more serious and more difficult to reduce or eliminate. The pressure loss in the pump inlet passage can be reduced to an almost negligible percentage by making the inlet passage a short smooth-wall, properly contoured channel of liberal and substantially constant cross-section. The velocity of the fluid at its entrance to the impeller, with resulting vortex circulation, can be avoided by undercutting the impeller blades, as exemplified by notches 48, and modifying the cut-water, as exemplified by the use of lugs 49 and 50, in place of a baffle wall (such as 13 of Fig. 1) in the conventional vortex pump.

One of the chief limitations of the vortex type pump is the loss of pressure rise across the pump when the inlet pressure is reduced, particularly to values materially below normal atmospheric pressure. I have found that this loss in pressure rise is due to the pump running partially empty, since there is no indication that the pressure rise is at all dependent upon the pressure level of the entering fluid so long as the pump is full. Accordingly, when a high entrance velocity exists in the region of entry into the impeller, the static pressure at this point may become less than the vapor pressure or bubble point of the liquid, and an empty space may exist in the inlet, with an adverse effect on pump pressure rise. By substantially reducing the entrance velocity of the fluid entering the impeller by the use of lugs 49—50, the static pressure of the fluid is correspondingly raised, resulting in a substantial increase in pump pressure rise and the ability of the pump to handle fluids of high volatility, such as hot aviation gasoline.

As mentioned in column 1, lines 48–59 above, conventional prior art vortex pumps develop high internal pressures and consume maximum pump input power at discharge shut-off. In order to overcome these adverse characteristics, I have provided a discharge pressure relief valve which is adapted to open when a selected discharge pressure is reached and return the pumped fluid from the discharge passage to the pump inlet passage. As illustrated in Fig. 4, this valve is of the poppet type with a bevelled disk head 51 which seats in a sleeve 52, positioned in a bore 53 in housing 20, and connects discharge outlet 26 to inlet 25 through a plurality of apertures 54. Valve 51 is biased toward closed position by a spring 55 whose tension and rate are such as to permit said valve to open when the discharge pressure reaches a selected maximum value, and to maintain said pressure constant at said maximum value, whenever the speed of the pump impeller and the degree of closure of the discharge outlet are such as would otherwise cause the pump discharge pressure to exceed such maximum value.

The operation of valve 51 not only insures against excessive internal pump pressures, but also prevents excessive absorption of pump input power that does no useful work.

While I have shown and described the preferred embodiments of my invention, I desire it to be understood that I do not limit myself to the precise details of construction and arrangement of elements, as these may be changed and modified by those skilled in the art without departing from the spirit of my invention or exceeding the scope of the appended claims.

I claim:

1. A rotary pump comprising a housing having an annular fluid pumping passage with a fluid inlet region and a fluid discharge region, an impeller mounted for rotation in said annular fluid pumping passage in said housing, said impeller having a radially extending portion terminating in a cylindrical wall and a radial side wall spaced axially from said radially extending portion, radial blades on said impeller which traverse only the inner portion of said passage; said radial blades having outer ends located in the plane of said cylindrical wall and extending axially from the radial portion of said impeller to the plane of the radial side wall thereof, each adjacent pair of blades and the radial connecting portion of said impeller therebetween defining a bucket with an arcuate bottom wall that extends from the plane of the radial side wall of the impeller to the cylindrical wall portion thereof and terminates in an opening in the plane of said radial side wall; means provided by said housing for introducing fluid laterally through said openings into the root zone of said buckets, each of said blades having a diagonal lower edge extending from the plane of the impeller radial side wall inwardly and downwardly and terminating at said arcuate bottom wall at a point which is substantially opposite the midpoint of said means for introducing fluid; whereby vortex currents in said passage are materially reduced.

2. A rotary pump according to claim 1, wherein the lower edge of each said blades and the adjacent portion of said bottom wall define an undercut notch, located radially inwardly of the circular path traversed by said blades; and said housing has integral lugs which form a portion of said means for introducing fluid and which project into said notches, for retarding the velocity of fluid entering said buckets; thereby correspondingly increasing the static pressure of said fluid and lowering the inlet pressure level at which said pump can operate without cavitation.

3. A rotary pump according to claim 1, wherein the inlet and discharge regions of said passage are connected by a bore, and a pressure relief valve is provided in said bore which normally closes said bore and is adapted to open when the fluid pressure differential between said regions exceeds a selected value, whereby the fluid pressure in said pump never exceeds a selected maximum value, and the power consumption of said pump under discharge outlet restriction is substantially reduced.

4. A rotary pump according to claim 2, wherein said radial blades extend on opposite sides of the radially extending portion terminating in a cylindrical wall and form identical buckets on opposite sides of said impeller, and a baffle is provided in said passage adjacent its inlet region bestriding said impeller and bifurcating said passage into two equal inlet channels which terminate in a plurality of arcuate ports and form said means for introducing fluid laterally through said openings into said buckets, whereby fluid enters said buckets laterally in the root zone thereof.

5. A rotary pump according to claim 4, wherein said housing has a fixed partition wall which extends from a point near the inlet region to a point adjacent the outlet region of said passage and circumferentially encompasses the outer blade portion of said impeller, thus dividing said passage into two equal channels which communicate through said ports with said inlet channels and merge into a single discharge channel adjacent the outlet region of said passage.

6. A rotary pump according to claim 4, wherein the notches define a plurality of oppositely disposed circular grooves in the radial sides of said impeller and wherein lugs are provided on opposite sides of said housing which coact with said grooves so that the fluid enters said buckets laterally, thereby materially reducing the vortex currents in said passage adjacent said impeller.

7. A rotary pump according to claim 6, wherein said lugs are integral with the walls of said housing and arranged to engage in said circular grooves with a close running fit, whereby the velocity of the fluid entering said impeller is retarded and the static pressure of said fluid is correspondingly increased.

8. A rotary pump according to claim 7, wherein said lugs are arranged in a plurality of oppositely disposed pairs, one pair being located adjacent the terminal end of the inlet channels to said impeller, and one pair being located adjacent the entrance to the discharge channel which terminates in the outlet of said passage.

9. A rotary pump according to claim 8, wherein said circular grooves and said lugs are of generally triangular cross-section, with their bases parallel to the plane of rotation of said impeller.

10. A rotary pump according to claim 5, wherein said housing comprises two matching parts which abut each other in the central plane of rotation of said impeller; each of said parts having matching contoured grooves which define the fluid channels in said housing.

References Cited in the file of this patent

UNITED STATES PATENTS

| | | |
|---|---|---|
| 915,451 | Lindner | Mar. 16, 1909 |
| 1,973,669 | Spoor | Sept. 11, 1934 |
| 1,976,896 | Siemen | Oct. 16, 1934 |
| 2,039,815 | Lupfer | May 5, 1936 |
| 2,045,851 | Hamilton | June 30, 1936 |
| 2,056,553 | Abramson | Oct. 6, 1936 |
| 2,296,640 | Hansen | Sept. 22, 1942 |
| 2,321,276 | De Bolt | June 8, 1943 |
| 2,380,606 | Moody | July 31, 1945 |
| 2,625,105 | Fincher | Jan. 13, 1953 |
| 2,636,440 | Funk | Apr. 28, 1953 |
| 2,724,338 | Roth | Nov. 22, 1955 |

FOREIGN PATENTS

| | | |
|---|---|---|
| 18,592 | Great Britain | of 1901 |